US00RE48780E

(19) United States
(12) Reissued Patent
Lee et al.

(10) Patent Number: US RE48,780 E
(45) Date of Reissued Patent: Oct. 19, 2021

(54) METHOD AND APPARATUS FOR EXTRACTING STATIC PATTERN BASED ON OUTPUT OF EVENT-BASED SENSOR

(71) Applicant: SAMSUNG ELECTRONICS CO., LTD., Suwon-si (KR)

(72) Inventors: Jun Haeng Lee, Hwaseong-si (KR); Keun Joo Park, Seoul (KR); Changwoo Shin, Hwaseong-si (KR); Jooyeon Woo, Hwaseong-si (KR); Hyunsurk Eric Ryu, Hwaseong-si (KR); Seokjin Hong, Hwaseong-si (KR)

(73) Assignee: SAMSUNG ELECTRONICS CO., LTD., Suwon-si (KR)

(21) Appl. No.: 16/291,685

(22) Filed: Mar. 4, 2019

Related U.S. Patent Documents

Reissue of:
(64) Patent No.: 9,921,643
Issued: Mar. 20, 2018
Appl. No.: 15/017,711
Filed: Feb. 8, 2016

(30) Foreign Application Priority Data

Apr. 28, 2015 (KR) ..... 10-2015-0059746

(51) Int. Cl.
*G06K 9/00* (2006.01)
*G06F 3/01* (2006.01)
(Continued)

(52) U.S. Cl.
CPC ..... *G06F 3/012* (2013.01); *G06F 1/1633* (2013.01); *G06F 1/3203* (2013.01); *G06F 3/017* (2013.01);
(Continued)

(58) Field of Classification Search
CPC ..... G06F 3/00; G06F 3/017; G06K 9/00335; G06K 9/00355; G06K 9/00375; G06K 9/00389; G06K 9/4604
(Continued)

(56) References Cited

U.S. PATENT DOCUMENTS 6,833,849 B1 * 12/2004 Kurokawa ..... G11B 27/28 715/723
7,728,269 B2 6/2010 Lichtsteiner et al.
(Continued)

FOREIGN PATENT DOCUMENTS

CN 104182049 A 12/2014
CN 104516499 A 4/2015
(Continued)

OTHER PUBLICATIONS

Communication dated Aug. 25, 2020, from the State Intellectual Property Office of People's Republic of China in counterpart Application No. 201610260737.6.
(Continued)

*Primary Examiner* — Adam L Basehoar
(74) *Attorney, Agent, or Firm* — Sughrue Mion, PLLC

(57) ABSTRACT

A method of extracting a static pattern from an output of an event-based sensor. The method may include receiving an event signal from the event-based sensor in response to dynamic input, and extracting a static pattern associated with the dynamic input based on an identifier and time included in the event signal. The static pattern may be extracted from a map generated based on the identifier and time.

59 Claims, 18 Drawing Sheets

(51) Int. Cl.

| | |
|---|---|
| ***G06T 7/246*** | (2017.01) |
| ***G06T 7/20*** | (2017.01) |
| ***G06F 1/32*** | (2019.01) |
| ***G06F 3/16*** | (2006.01) |
| ***G06K 9/46*** | (2006.01) |
| ***G06F 1/16*** | (2006.01) |
| ***G06F 1/3203*** | (2019.01) |

(52) U.S. Cl.
CPC ..... *G06F 3/167* (2013.01); *G06K 9/00355* (2013.01); *G06K 9/00389* (2013.01); *G06K 9/4604* (2013.01); *G06T 7/20* (2013.01); *G06T 7/246* (2017.01); *G06T 2207/10028* (2013.01)

(58) Field of Classification Search
USPC ..... 715/700, 863; 345/156, 158
See application file for complete search history.

(56) References Cited

U.S. PATENT DOCUMENTS

| | | | | |
|---|---|---|---|---|
| 7,932,923 | B2 * | 4/2011 | Lipton | G06F 16/7837 348/143 |
| 8,243,986 | B2 | 8/2012 | Silver et al. | |
| 8,698,092 | B2 | 4/2014 | Lee et al. | |
| 8,756,352 | B2 | 6/2014 | Eyraud et al. | |
| 9,275,284 | B2 * | 3/2016 | Gurbuz | G06F 17/30 |
| 9,323,985 | B2 * | 4/2016 | Heim | G06F 3/04883 |
| 2006/0197664 | A1 * | 9/2006 | Zhang | G06T 7/246 340/555 |
| 2012/0162416 | A1 * | 6/2012 | Su | H04N 7/185 348/143 |
| 2013/0215266 | A1 * | 8/2013 | Trundle | G08B 13/19602 348/143 |
| 2013/0335595 | A1 | 12/2013 | Lee et al. | |
| 2014/0040653 | A1 | 2/2014 | Etkin et al. | |
| 2014/0184498 | A1 | 7/2014 | Lee et al. | |
| 2014/0354537 | A1 | 12/2014 | Park et al. | |
| 2014/0363049 | A1 | 12/2014 | Benosman et al. | |
| 2014/0368712 | A1 | 12/2014 | Park et al. | |
| 2015/0030204 | A1 | 1/2015 | Lee et al. | |
| 2015/0095818 | A1 | 4/2015 | Lee et al. | |

FOREIGN PATENT DOCUMENTS

| | | | |
|---|---|---|---|
| EP | 2677500 | A2 | 12/2013 |
| EP | 2806334 | A1 | 11/2014 |
| JP | 2006-67452 | A | 3/2006 |
| JP | 2009-141702 | A | 6/2009 |
| KR | 10-2013-0061397 | A | 6/2013 |
| KR | 1020130142913 | A | 12/2013 |

OTHER PUBLICATIONS

Shoushun Chen et al. "A biologically inspired system for human posture recognition", In proceedings of the IEEE Biomedical Circuits and Systems Conference: Beijing, China, 2009, (pp. 113-116).
Zhao, Bo, "A Biologically Inspired Human Posture Recognition System", 2014, Nanyang Technological University, 185 pages total.
"Non-Contact Gesture Sensor of the AMS Brings New Experience in Human-Computer Interaction", Focus on Industry, Application Of Electronic Technique, 2015, 3 pages.
Communication dated Dec. 23, 2020 issued by the Korean Patent Office in application No. 10-2015-0059746.
Gunjal, V., "Development of Feature Descriptors for Event-Based Vision Sensors", Dec. 18, 2012, 81 pages total, XP 055195885, https://www.ini.uzh.ch/~tobi/wiki/lib/exe/fetch.php?media=gunjalbachelorsthesis2012.pdf.
Zhao, B., "Excerpts from: A Biologically Inspired Human Posture Recognition System", Jan. 1, 2014, 14 pages total, XP 55298169, http://www.ntu.edu.sg/home/eechenss/Papers/Thesis-2014-A%20biologically%20inspired%20human%20posture%20recognition%20system.pdf.
Franco, et al., "Event-based Image Processing using a Neuromorphic Vision Sensor", Nov. 13, 2013, IEEE International Autumn Meeting on Power Electronics and Computing (ROPEC), 6 pages total, XP 032541092.
Communication dated Sep. 6, 2016, issued by the European Patent Office in counterpart European Patent Application No. 16167010.4.

* cited by examiner

METHOD AND APPARATUS FOR EXTRACTING STATIC PATTERN BASED ON OUTPUT OF EVENT-BASED SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 9,921,643, which was filed as U.S. application Ser. No. 15/017,711 on Feb. 8, 2016 and issued on Mar. 20, 2018, which claims priority from Korean Patent Application No. 10-2015-0059746, filed on Apr. 28, 2015 in the Korean Intellectual Property Office, the disclosures of which are incorporated herein by reference in their entireties.*

CROSS-REFERENCE TO RELATED APPLICATION

This application claims priority from Korean Patent Application No. 10-2015-0059746, filed on Apr. 28, 2015, in the Korean Intellectual Property Office, the disclosure of which is incorporated herein by reference in its entirety.

BACKGROUND

1. Field

Methods and apparatuses consistent with exemplary embodiments relate to processing an output of an event-based sensor.

2. Description of the Related Art

A human-computer interaction (HCI) operates in a user interface. Various user interfaces used to recognize user inputs may provide a natural interaction between humans and computers.

To recognize user input, various sensors may be used. To provide a natural interaction, a sensor quickly responding to a user input may be used. For example, various mobile devices may need to consume relatively low power while performing various smart functions using a user interface. Accordingly, there is a need for a sensor that has a low power consumption, a high response speed, and high reliability for the purpose of sensing. In addition, because an output of a sensor is determined based on an operation characteristic of the sensor, there is a need for a scheme of processing the output of the sensor.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a pattern extraction method including receiving a signal indicating an event from an event-based sensor; extracting a static pattern based on an identification and time included in the received event signal; and outputting the extracted static pattern, According to another aspect of an exemplary embodiment, there is provided a pattern extraction apparatus including an event-based sensor configured to output a signal indicating an event, the event signal comprising time and an identification of the event and a processor configured to extract a static pattern based on the event signal and to output the extracted static pattern outside the pattern extraction apparatus.

BRIEF DESCRIPTION OF THE DRAWINGS

The above and/or other aspects of exemplary embodiments will become apparent and more readily appreciated from the following detailed description of exemplary embodiments, taken in conjunction with the accompanying drawings of which.

DETAILED DESCRIPTION OF EXEMPLARY EMBODIMENTS

Figure 1:
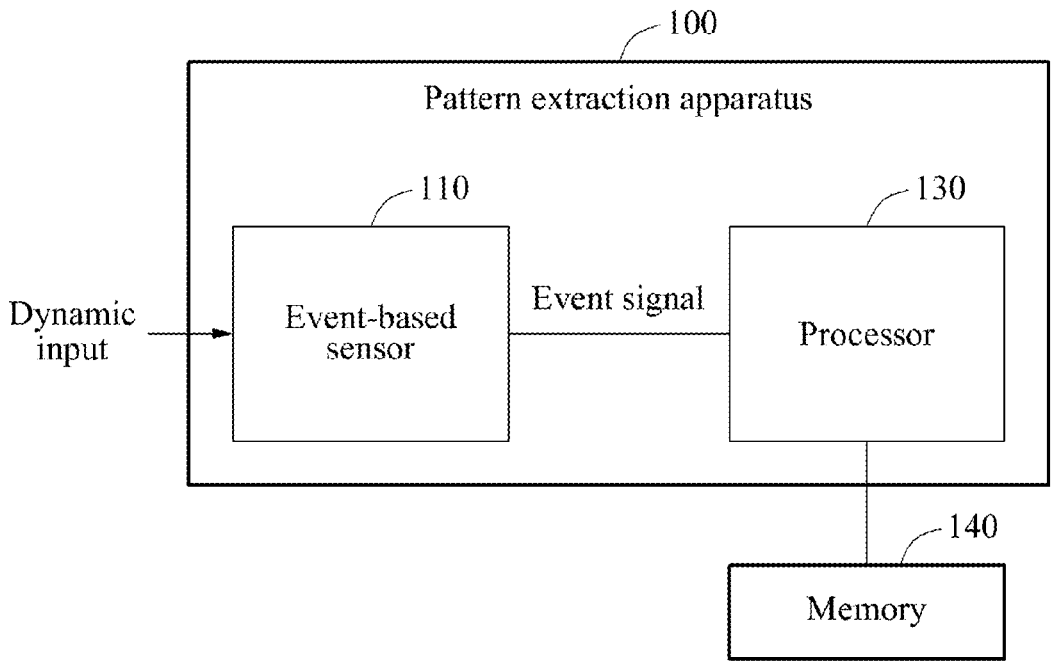
FIG. 1 is a block diagram illustrating a pattern extraction apparatus according to an exemplary embodiment.

Reference will now be made in detail to exemplary embodiments, examples of which are illustrated in the accompanying drawings, wherein like reference numerals refer to the like elements throughout. Exemplary embodiments are described below with reference to the figures.

Particular structural or functional descriptions of exemplary embodiments are merely intended for the purpose of illustration and the exemplary embodiments according to the concept of the present disclosure may be implemented in various forms and should not be construed as being limited to those described in the present disclosure.

Various alterations and modifications may be made to exemplary embodiments, some of which will be illustrated in detail in the drawings. However, it should be understood that these exemplary embodiments are not construed as limited to the illustrated forms and include all changes, equivalents or alternatives within the present disclosure.

Although terms of "first" or "second" are used to explain various components, the components are not limited to the terms. These terms are used only to distinguish one component from another component. For example, a first component may be referred to as a second component, or similarly, the second component may be referred to as the first component within the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (for example, "between" versus "directly between," or "adjacent" versus "directly adjacent").

The terminology used herein is for the purpose of describing particular exemplary embodiments only and is not intended to be limiting of exemplary embodiments. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not construed as an ideal or excessively formal meaning unless otherwise defined herein.

FIG. 1 is a block diagram illustrating a pattern extraction apparatus according to an exemplary embodiment.

Referring to FIG. 1, a pattern extraction apparatus 100 includes an event-based sensor 110 and a processor 130. The processor 130 may be implemented by a microprocessor, a controller, a central processing unit (CPU), an arithmetic logic unit (ALU), a digital signal processor (DSP), a field programmable gate array (FPGA), a programmable logic unit (PLU), one or more general-purpose or special purpose computers capable of responding to and executing instructions, or various combinations thereof.

In an exemplary embodiment, for convenience of description, an operation and a structure of a pattern extraction apparatus will be described, however, exemplary embodiments may be extended to various apparatuses. For example, exemplary embodiments may also be applicable to various computing apparatuses including pattern extraction apparatuses, mobile apparatuses, or various security apparatuses. The mobile apparatuses may include, for example, smartphones or wearable devices.

The event-based sensor 110 outputs an event signal in response to a dynamic input. The event signal may include time information and identification information corresponding to the dynamic input. The dynamic input may include an event to change light incident on at least one pixel in the event-based sensor 110. The identification information may be an address of a plurality of pixels included in the event-based sensor 110. The time information may include a timestamp indicating a time at which the dynamic input is sensed by at least one pixel in the event-based sensor 110. Hereinafter, a process by which the event-based sensor 110 generates an event signal will further be described according to an exemplary embodiment.

The event-based sensor 110 may include a plurality of sensing pixels. The event-based sensor 110 may generate an event signal including identification information of an active pixel sensing an event among the plurality of sensing pixels. The event-based sensor 110 may use a neuromorphic sensing scheme, according to an exemplary embodiment.

The dynamic input may include an event to change light incident on at least one pixel in the event-based sensor 110, as described above. The event may be, for example, an event associated with a change in an input. The event may include, for example, an event in which an intensity of incident light changes, an event in which a color of incident light changes, an event in which a volume of input sound changes, an event in which a frequency of input sound changes, or an event in which a strength of stimulation changes. The event-based sensor 110 may be an event-based vision sensor. When the event-based sensor 110 is an event-based vision sensor, the identification information may include location information indicating at least one pixel sensing the dynamic input among a plurality of pixels included in the event-based sensor 110. Hereinafter, for convenience of description, the event-based sensor 110 is assumed as an event-based vision sensor to sense an event in which an intensity of incident light changes, however, there is no limitation thereto and this is provided by way of an example only. Accordingly, exemplary embodiments may also be applied to various event-based sensors.

The plurality of sensing pixels in the event-based sensor 110 may sense an event, for example, an event in which an intensity of incident light changes. A sensing pixel that senses an event among the plurality of sensing pixels may be referred to as an "active pixel." In response to the active pixel sensing an event, an activation signal may be generated.

The identification information may include location information indicating at least one pixel sensing the dynamic input among a plurality of pixels included in the event-based sensor 110, as described above, according to an exemplary embodiment. The event-based sensor 110 may generate the identification information of the active pixel. For example, the event-based sensor 110 may generate an event signal including location information to identify an active pixel based on an activation signal generated by the active pixel. The event-based sensor 110 may asynchronously generate and output an event signal and accordingly, may operate at a high speed and low power in comparison to a frame-based vision sensor configured to scan all pixels for each frame.

The identification information may be an address of a plurality of pixels included in the event-based sensor 110. The event-based sensor 110 may generate an asynchronous address event (AE) signal based on active pixels. For example, when a change in a log intensity after a last event exceeds an upper threshold or a lower threshold, the event-based sensor 110 may generate an ON event signal or an OFF event signal. The event-based sensor 110 may additionally generate timing information of the event signal. The event-based sensor 110 may interface with a synchronous system based on the timing information. Due to a low density and a low latency of an output of the event-based sensor 110, the event-based sensor 110 may be used for a high-speed object tracking application requiring feedback of a quick response. The high-speed object tracking application may include, for example, high-speed robotics.

An event-based sensor may be used to acquire an image from various apparatuses including a smartphone, a tablet personal computer (PC), a television (TV) and a display. In an example, an event-based sensor may be used in an interface of a smartphone. The event-based sensor may be used in, for example, a non-contact gesture recognition interface. The interface may be used to recognize a gesture to unlock a smartphone, a gesture to turn up a volume of the smartphone, or a gesture to turn over pages on the smartphone. The event-based sensor may accurately and efficiently recognize a non-contact gesture. In another example, an event-based sensor may be used in a security camera. In this example, the event-based sensor may be used to recognize an object that stops moving using the security camera.

The event-based sensor 110 may output an event signal. An output of an event-based vision sensor may include an event signal corresponding to a real activity as well as an event signal corresponding to a background noise activity. The event signal corresponding to the background noise activity may be generated by a junction leakage current or a thermal noise occurring in switches connected to floating nodes in sensing pixels of the event-based sensor 110.

To perform filtering on the event signal corresponding to the background noise activity, the event-based sensor 110 may generate a pass flag to identify event signals that are spatiotemporally associated with each other. Thus, the event-based sensor 110 may reduce a communication and computation load, and may enhance an information rate. In an exemplary embodiment, because a background noise activity has a random pattern, it may be easily removed through filtering using a spatial correlation by way of an example.

The event-based sensor 110 may use a power-gating scheme. The power-gating scheme may be a scheme of minimizing power consumption by activating only a communication circuit and a threshold detection circuit corresponding to a sensing pixel that senses an event. Also, the event-based sensor 110 may use a correlation filter chip. By using the correlation filter chip, the event-based sensor 100 may be applied to an embedded neuromorphic visual and auditory system requiring low power consumption and quick response.

The time information may include a timestamp indicating a time at which the dynamic input is sensed by at least one pixel in the event-based sensor 110, as described above, according to an exemplary embodiment. The event-based sensor 110 may generate a timestamp indicating a time at which the dynamic input is sensed by an active pixel. In response to the active pixel sensing an event, an activation signal may be generated. In an example, the event-based sensor 110 may generate a timestamp based on a time at which an activation signal is generated. In another example, the processor 130 may generate a timestamp in response to the event signal being received from the event-based sensor 110.

The processor 130 extracts a static pattern associated with the dynamic input, based on the event signal. As described above, according to an exemplary embodiment, the dynamic input may include an event to change light incident on at least one pixel in the event-based sensor 110. The static pattern may correspond to an appearance of an object associated with the dynamic input. For example, the dynamic input may include a motion of an object, and the static pattern may correspond to an appearance of the object in a state in which the motion stops. Hereinafter, according to an exemplary embodiment, a process by which the processor 130 extracts the static pattern will further be described.

The processor 130 may store the identification information and the time information based on the event signal, and may extract the static pattern based on the stored identification information and the stored time information. For example, the processor 130 may extract the static pattern based on history of the identification information and the time information based. The identification information and the time information may be stored in a memory 140 in the form of a timestamp map. The pattern extraction apparatus 100 may include a memory 140 to store a timestamp map. A memory may be internal to the pattern extraction apparatus or may be external thereto connected via a network. The memory may include a buffer, a flash memory, a hard drive, and so on. The timestamp map will be further described with reference to FIG. 2 according to an exemplary embodiment.

Figure 2:
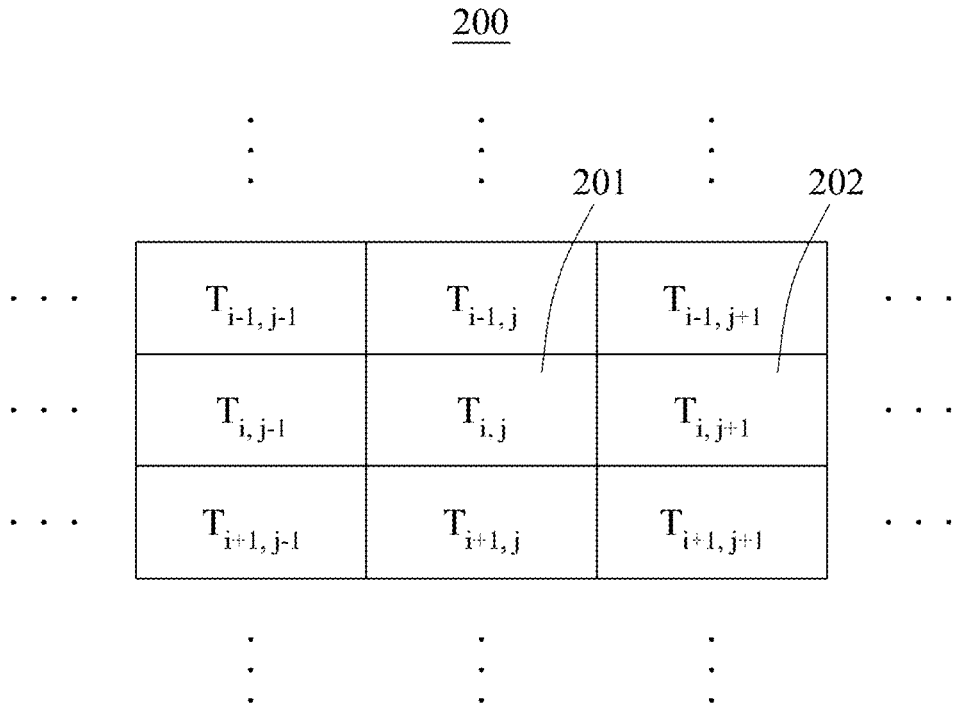
FIG. 2 is a view illustrating a timestamp map according to an exemplary embodiment.

FIG. 2 is a view illustrating a timestamp map according to an exemplary embodiment. Referring to FIG. 2, a timestamp map 200 includes elements corresponding to pixels in the event-based sensor 110. For example, an element 201 stores a timestamp corresponding to a pixel located at (i, j) among pixels included in the event-based sensor 110.

Each of the elements in the timestamp map 200 may store a latest time at which a timestamp signal corresponding to each of the elements is received. For example, referring to FIG. 2, last time when a timestamp signal corresponding to the element 201 located at (i, j) is received is $T_{i,j}$, and last time when a timestamp signal corresponding to an element 202 located at (i, j+1) is received is $T_{i,j+1}$. In the following description, a time point in which a timestamp signal is received may be referred to as a "timestamp" according to an exemplary embodiment.

When a timestamp signal is received, the processor 130 may update the timestamp map 200 based on the received timestamp signal. For example, the processor 130 may detect an element corresponding to the received timestamp signal among a plurality of elements included in the timestamp map 200, and may update a value stored in the detected element to a timestamp at which the timestamp signal is received.

The processor 130 may store a time in which a new timestamp signal is received in a millisecond (ms) or less or a microsecond (μs) or less, for each of the elements, according to an exemplary embodiment. The processor 130 may extract the static pattern based on a timestamp of a last timestamp signal received in each of the elements, regardless of a history of timestamp signals received over time. Thus, the processor 130 may extract the static pattern with a small amount of calculation and a small memory capacity.

The processor 130 may overwrite the received time information using a storage element corresponding to the received identification information. The processor 130 may discard a value stored in advance in the storage element, and may store the received time information in the storage element. The static pattern will further be described with reference to FIG. 3 according to an exemplary embodiment.

Figure 3:
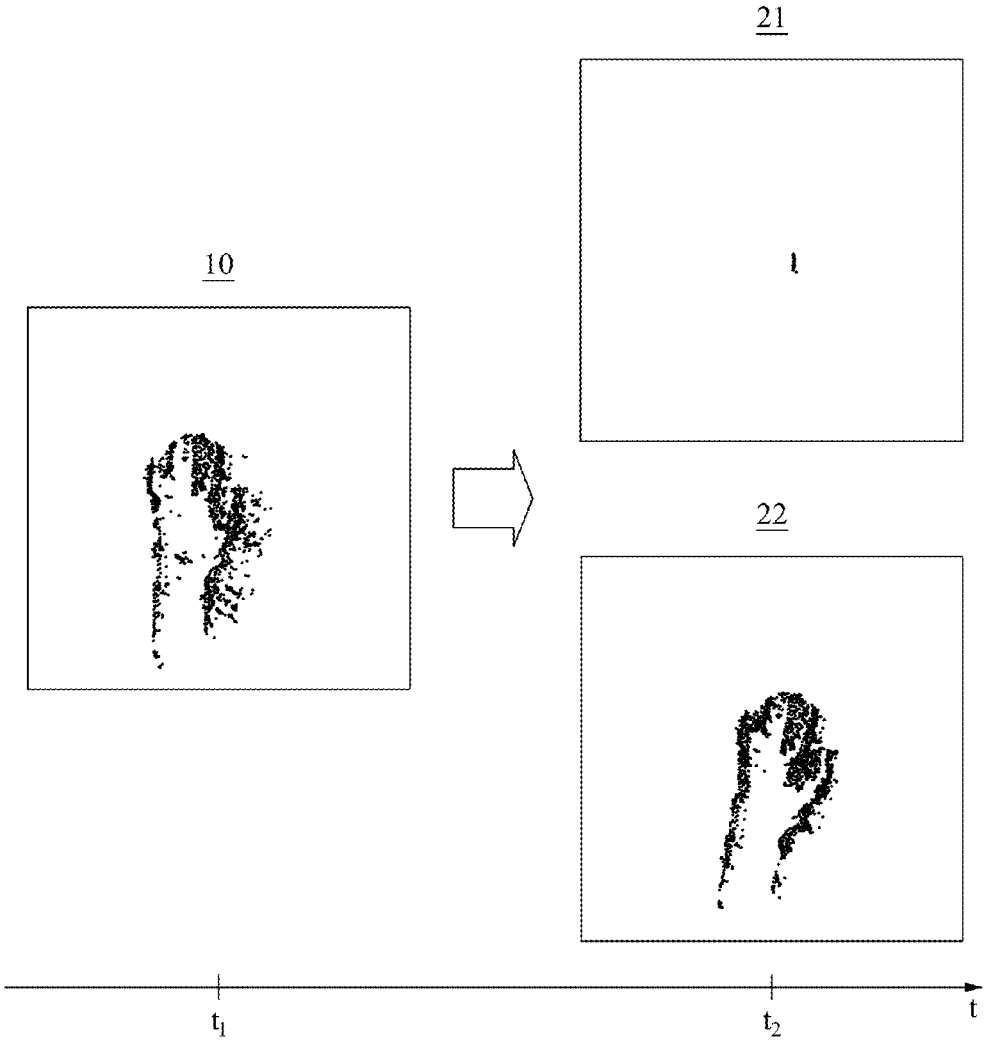
FIG. 3 is a flow diagram illustrating a static pattern extraction result according to an exemplary embodiment.

FIG. 3 is a flow diagram illustrating a static pattern extraction result according to an exemplary embodiment. FIG. 3 illustrates an output 10 based on an event signal at a time $t_1$, an output 21 based on an event signal at a time $t_2$, and a static pattern 22 extracted based on a timestamp map. In FIG. 3, the time $t_1$ corresponds to a state in which an object is moving, and the time $t_2$ corresponds to a state in which the object is stationary. The object exists in sensing area at the time $t_1$ and $t_2$. Since the event-based sensor 110 may output an event signal in response to a dynamic input as described above, according to an exemplary embodiment, an output corresponding to the event signal may basically change from the output 10 to the output 21 when the object stops moving. However, when a pattern is extracted from a timestamp map based on a method that will be described below, according to an exemplary embodiment, the output 10 may be reconstructed in the form of the static pattern 22.

Referring back to FIG. 1, according to an exemplary embodiment, the processor 130 extracts the static pattern associated with the dynamic input based on the identification information and the time information included in the event signal. For example, the processor 130 may extract the static pattern based on a ridge of a timestamp map. A timestamp of a last received timestamp signal may be stored in the timestamp map. When an object is moving, various timestamps may be stored in the timestamp map. When times of the timestamps are assumed as altitudes, timestamps in a predetermined time slot may form a ridge. The processor 130 may extract the ridge from the timestamp map. The ridge will be further described with reference to FIGS. 4 and 5, according to an exemplary embodiment.

Figure 4:
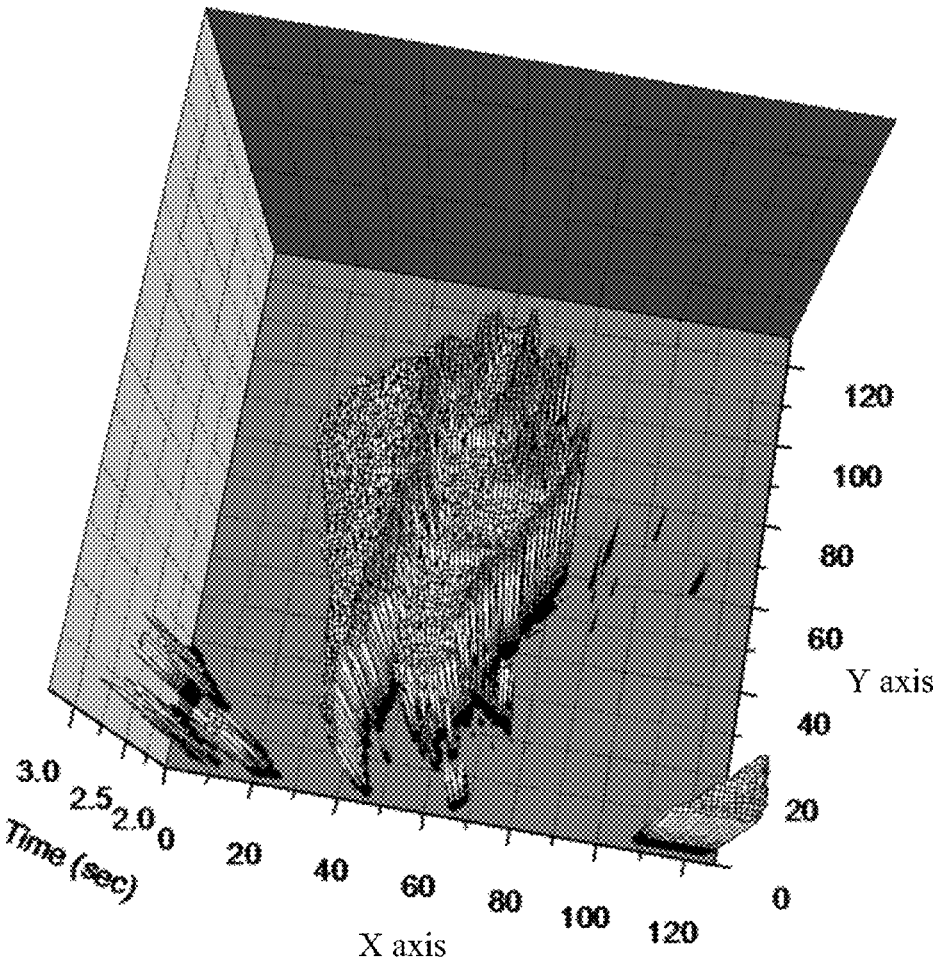
FIGS. 4 and 5 are views illustrating a ridge of a timestamp map according to an exemplary embodiment.
Figure 5:
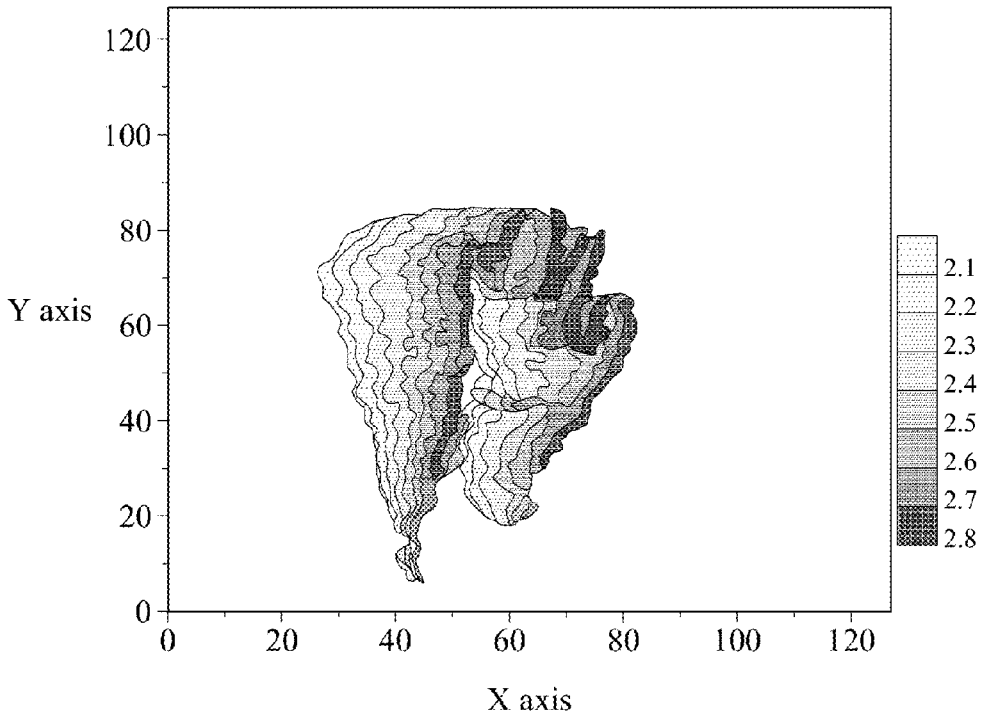

FIGS. 4 and 5 are views illustrating a ridge of a timestamp map according to an exemplary embodiment. FIG. 4 illustrates a timestamp map generated based on an event signal for a moving object. In FIG. 4, an X axis and a Y axis each represent location information of a pixel sensing a dynamic input, and a Z axis represents a timestamp. Accordingly, the location information may correspond to coordinates of the timestamp map, and time information may correspond to an altitude of the timestamp map. In FIG. 4, when the altitude increases, elements of the timestamp map may become dark. Accordingly, a darkest region of the timestamp map of FIG. 4 may correspond to a ridge or peak of movement.

FIG. 5 is a two dimensional diagram of the timestamp map such as the one shown in FIG. 4 according to an exemplary embodiment. In FIG. 5, an X axis and a Y axis each represent location information of a pixel sensing a dynamic input. Accordingly, the location information may correspond to coordinates of the timestamp map. Also, "2.1" through "2.8" of a color map in a right side of a graph of FIG. 5 may refer to timestamp values of a pixel sensing a dynamic input. For example, a region with a color corresponding to "2.8" in the timestamp map may include pixels having a timestamp value of "2.8." As shown in FIG. 5, even though a moving object stops, information on a movement of the object may remain in the timestamp map. The information on the movement of the object may include movement history of the object.

The darkest region corresponding to the ridge in the timestamp map indicates information about a latest movement. For example, pixels having a timestamp value of "2.8" in the timestamp map may include information about the latest movement. The processor 130 may extract a static pattern based on the ridge of the timestamp map and accordingly, may provide information on an appearance of the object despite a stationary state of the object, according to an exemplary embodiment.

Referring back to FIG. 1, the processor 130 extracts a ridge based on identification information and time information of a timestamp map. The processor 130 may determine the ridge using various schemes. In an exemplary embodiment, the processor 130 may determine a ridge based on elements storing time information within a threshold time interval among a plurality of elements included in the timestamp map. In another exemplary embodiment, the processor 130 may track a ridge so that a thickness of an edge included in the ridge may be equal to or less than a threshold thickness. Hereinafter, a process of determining a ridge will further be described with reference to FIGS. 6 through 12 according to an exemplary embodiment.

Figure 6:
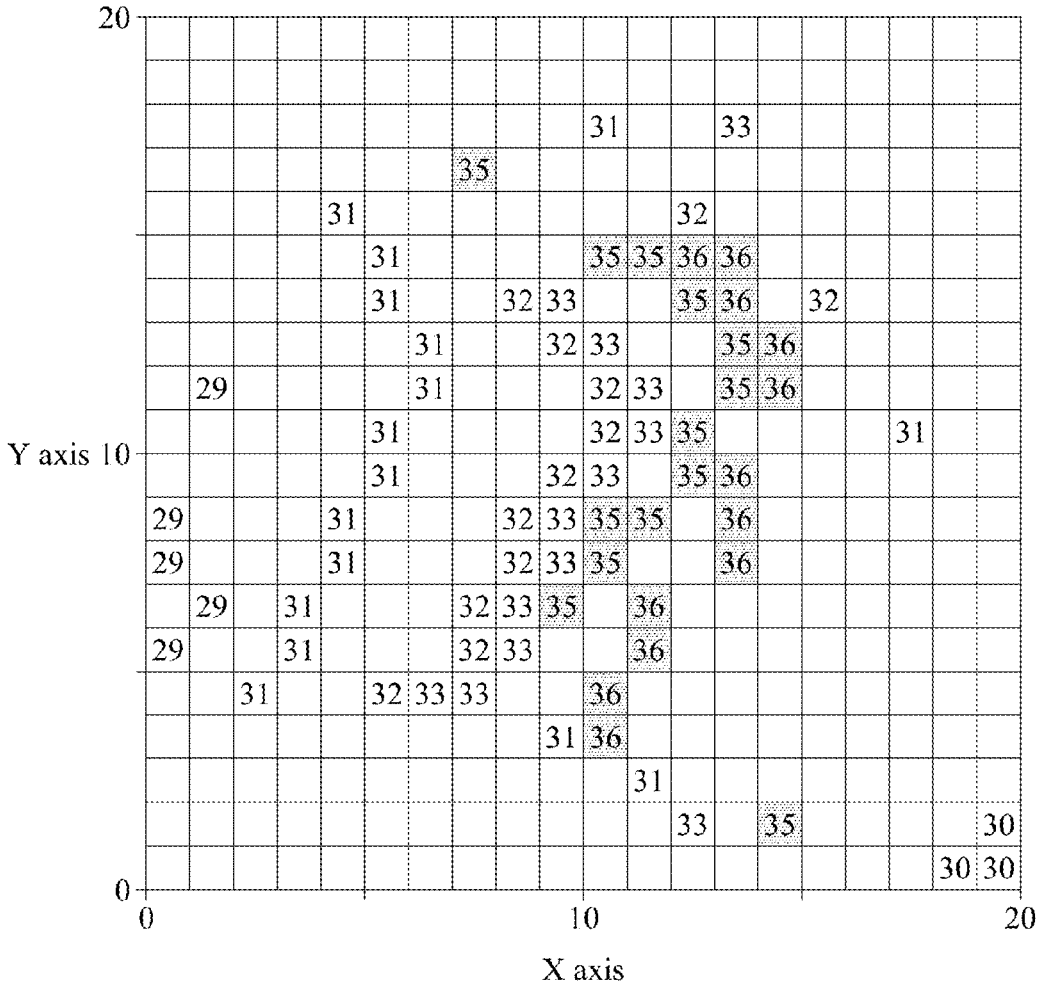
FIG. 6 is a view illustrating a process of extracting a static pattern based on a threshold time interval according to an exemplary embodiment.

FIG. 6 is a view illustrating a process of extracting a static pattern based on a threshold time interval according to an exemplary embodiment. FIG. 6 illustrates a 20×20 timestamp map with timestamps. The timestamp map of FIG. 6 shows that an object moved during a period from a time "29" to a time "36" and that a current time is now past the time "36."

The processor 130 may determine a ridge based on elements storing time information within a threshold time interval among a plurality of elements included in a timestamp map. For example, the processor 130 may set the threshold time interval based on a current time. According to an exemplary embodiment, elements corresponding to timestamps within the threshold time interval based on the current time may be used to determine a ridge.

For example, the processor 130 may set the threshold time interval to a unit time of "5" from the current time. When the current time is set to a time "40," elements corresponding to timestamps, each having a value equal to or greater than "35," may be determined to form a ridge, as shown in the timestamp map of FIG. 6 according to an exemplary embodiment.

The processor 130 may adjust a length of the threshold time interval based on a number of extracted elements. When a large number of elements or a small number of elements exist during the threshold time interval, it may be difficult to recognize an appearance of an object. Accordingly, the processor 130 may adjust the length of the threshold time interval to a level suitable for recognition of the appearance of the object. For example, the processor 130 may set a reference value of a number of elements included in a static pattern, and may adjust the length of the threshold time interval based on the reference value. The reference value may include at least one of a minimum value and a maximum value. In an exemplary embodiment, a reference value may be set in advance or may be dynamically adjusted based on a certain condition e.g., sharpness of a static pattern. The processor 130 may determine a ridge based on elements storing time information within the threshold time interval with the adjusted length. When a minimum number of elements is set to "25," elements corresponding to timestamps, each having a value of "35" or "36," in the timestamp map of FIG. 6 may be determined to form a ridge. Hereinafter, a process of adjusting a number of elements will be further described with reference to FIGS. 7 through 10 according to an exemplary embodiment.

In an exemplary embodiment, a number of elements being extracted may be too many or not enough, which would make it difficult to recognize an appearance of an object. In an exemplary embodiment, whether the number of elements is too many or not enough may be determined based on a reference value. The reference value may be experimentally determined. For example, an object is detected from a portion where a motion occurs, an image of the object is acquired from an event occurring during the motion, and a number of pixels used to generate the image is calculated. In this example, a number of pixels required to reconstruct the image may be predicted. In an event-based sensor, an event occurs in only a portion where a motion occurs, and accordingly in an exemplary embodiment only the portion where the motion occurs is analyzed regardless of a portion where a motion does not occur at least once.

Figure 7:
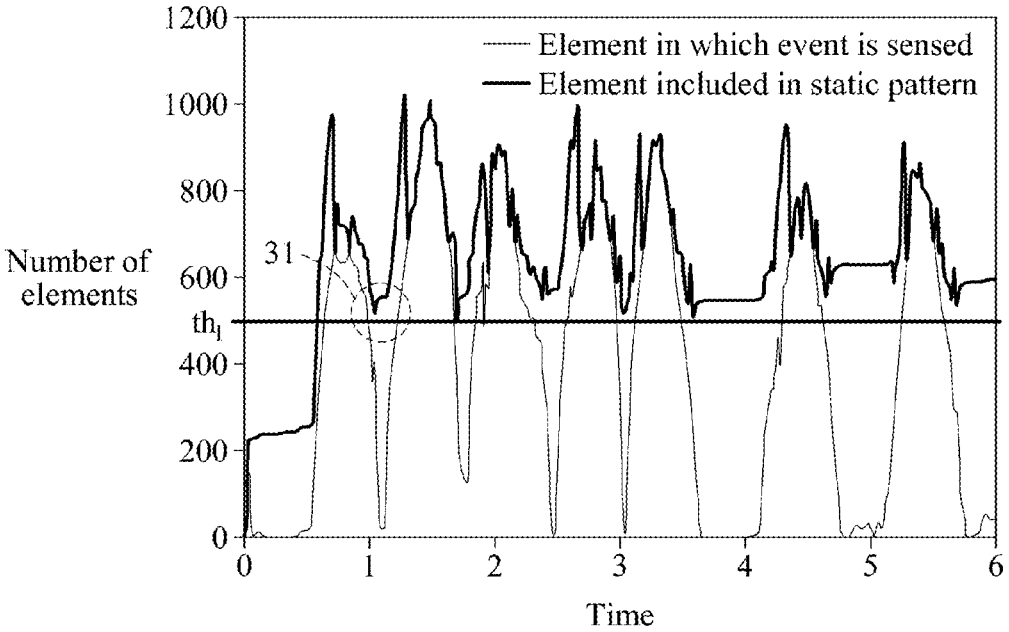
FIGS. 7 and 8 are flow diagrams illustrating a process of extracting a static pattern when a minimum number of elements is set according to an exemplary embodiment.
Figure 8:
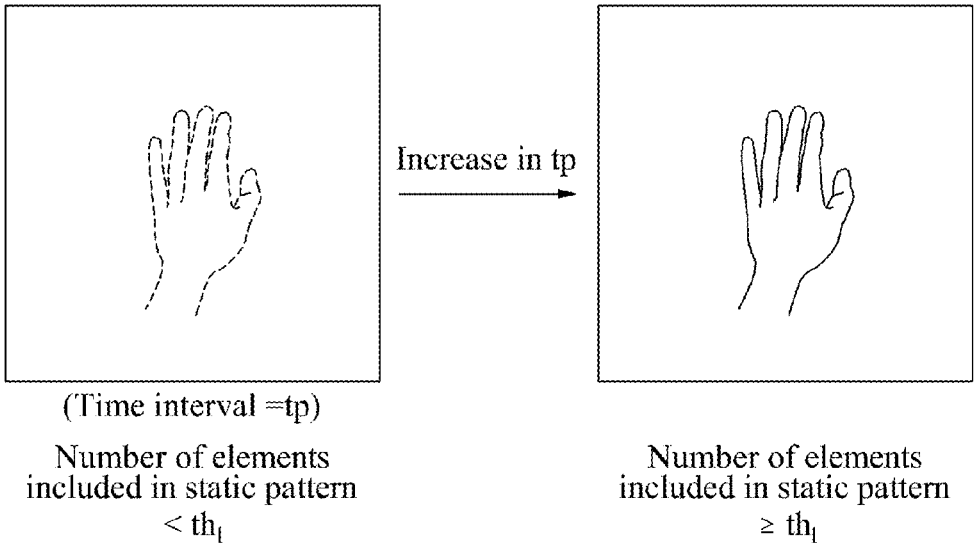

FIGS. 7 and 8 are flow diagrams illustrating a process of extracting a static pattern when a minimum number of elements is set according to an exemplary embodiment. Referring to FIG. 7, a time diagram corresponding to an element in which an event is sensed shows a number of elements in which an event is sensed over time. In FIG. 7, the number of the elements in which the event is sensed may repeatedly increase and decrease, which may indicate that a moving state and a stationary state of an object are repeated.

Also, FIG. 7 illustrates an element included in a static pattern and a number of elements used to extract the static pattern over time. The number of the elements used to extract the static pattern may be controlled by adjusting a length of a threshold time interval.

In FIG. 7, $th_1$ denotes a minimum number of elements. The processor 130 may adjust a length of a threshold time interval so that the number of the elements included in the static pattern may be equal to or greater than the minimum number $th_1$. For example, in a portion 31 of FIG. 7, the number of the elements in which the event is sensed may decrease in response to an object being stationary according to an exemplary embodiment.

In this example, the processor 130 may properly adjust the length of the threshold time interval so that the number of the elements included in the static pattern may be equal to or greater than the minimum number $th_1$. When the length of the threshold time interval is properly adjusted, a sharpness of the static pattern may be enhanced.

FIG. 8 illustrates an operation of the processor 130 to sharpen the static pattern for example in the portion 31 of FIG. 7, according to an exemplary embodiment. For example, when the number of the elements in the static pattern is less than the minimum number $th_1$, the static pattern may have low sharpness due to an insufficient number of elements used to extract the static pattern. The processor 130 may increase a number of elements used to extract the static pattern by increasing the length of the threshold time interval (tp), to enhance the sharpness of the static pattern. As shown in FIG. 8, a sharpness of a static pattern representing an appearance of an object may increase in response to an increase in the length of the threshold time interval.

Figure 9:
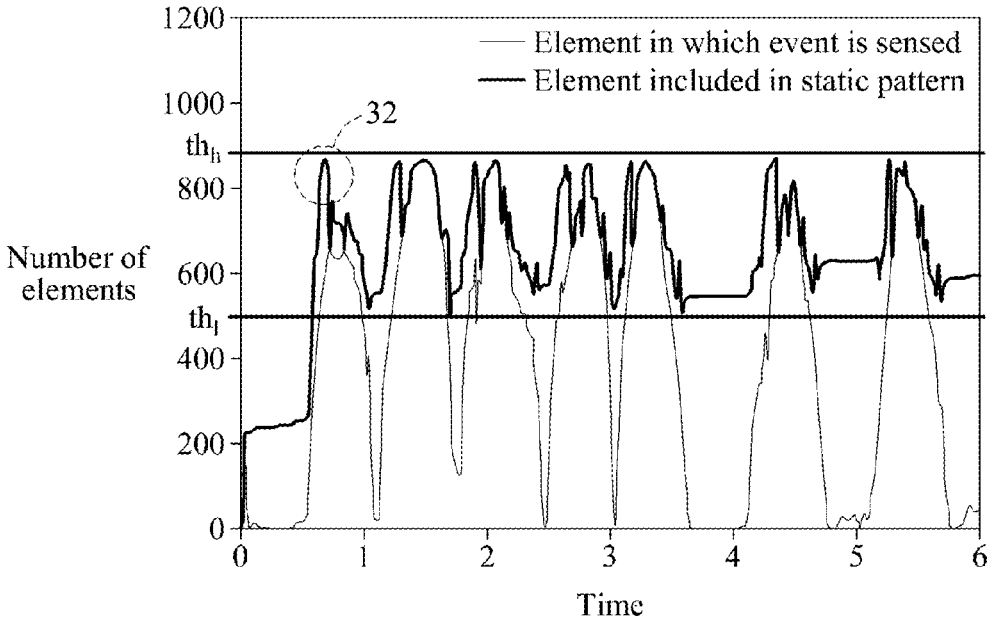
FIGS. 9 and 10 are flow diagrams illustrating a process of extracting a static pattern when a maximum number of elements is set according to an exemplary embodiment.
Figure 10:
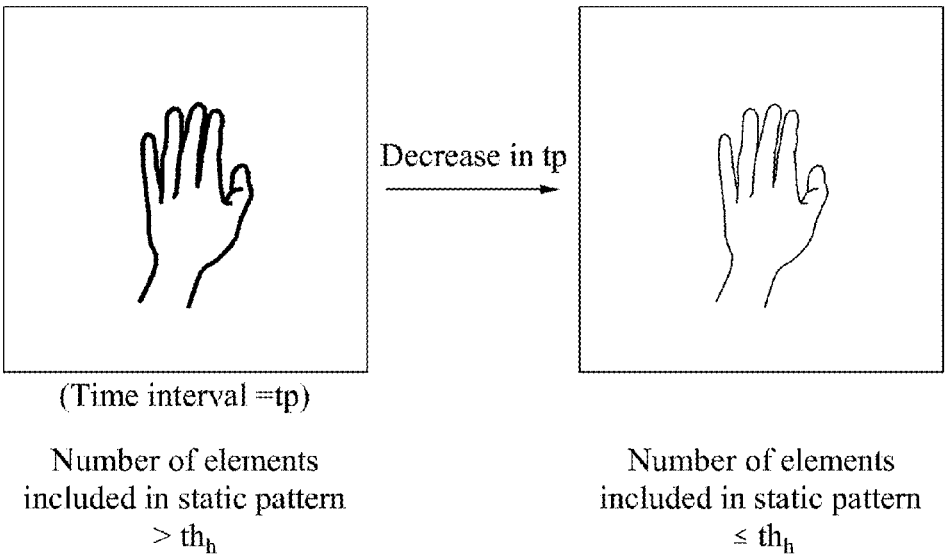

FIGS. 9 and 10 are flow diagrams illustrating a process of extracting a static pattern when a maximum number of elements is set according to an exemplary embodiment. FIG. 9 shows a number of elements over time, a minimum number $th_1$ of elements, and a maximum number $th_h$ of elements. The processor 130 may adjust a length of a threshold time interval so that a number of elements included in the static pattern may be equal to or greater than the minimum number $th_1$ and may be equal to or less than the maximum number $th_h$. For example, in a portion 32 of FIG. 9, a number of elements in which an event is sensed increases based on a movement of an object. In this example, the processor 130 may properly adjust the length of the threshold time interval so that the number of the elements include in the static pattern may be equal to or less than the maximum number $th_h$. When the length of the threshold time interval is properly adjusted, a sharpness of the static pattern may be enhanced. An exemplary embodiment of the minimum number $th_1$ has been described above and accordingly, further description thereof will not be repeated here.

FIG. 10 is a flow diagram illustrating an image in which the time interval is decreased such as an operation of the processor 130 in the portion 32 of FIG. 9, according to an exemplary embodiment. For example, when the number of the elements in the static pattern is greater than the maximum number $th_h$, an edge of the static pattern may be excessively thickened and noise may occur in an appearance of an object, due to an extremely large number of elements used to extract the static pattern. The processor 130 may properly control the number of elements used to extract the static pattern by reducing the length of the threshold time interval, to enhance a sharpness of the static pattern. As shown in FIG. 10, a sharpness of a static pattern representing an appearance of an object may increase in response to a decrease in the length of the threshold time interval, according to an exemplary embodiment.

As described above, according to an exemplary embodiment, the processor 130 may track a ridge so that a thickness of an edge included in the ridge may be equal to or less than a threshold thickness. A process of tracking a ridge will be further described with reference to FIGS. 11 and 12.

Figure 11:
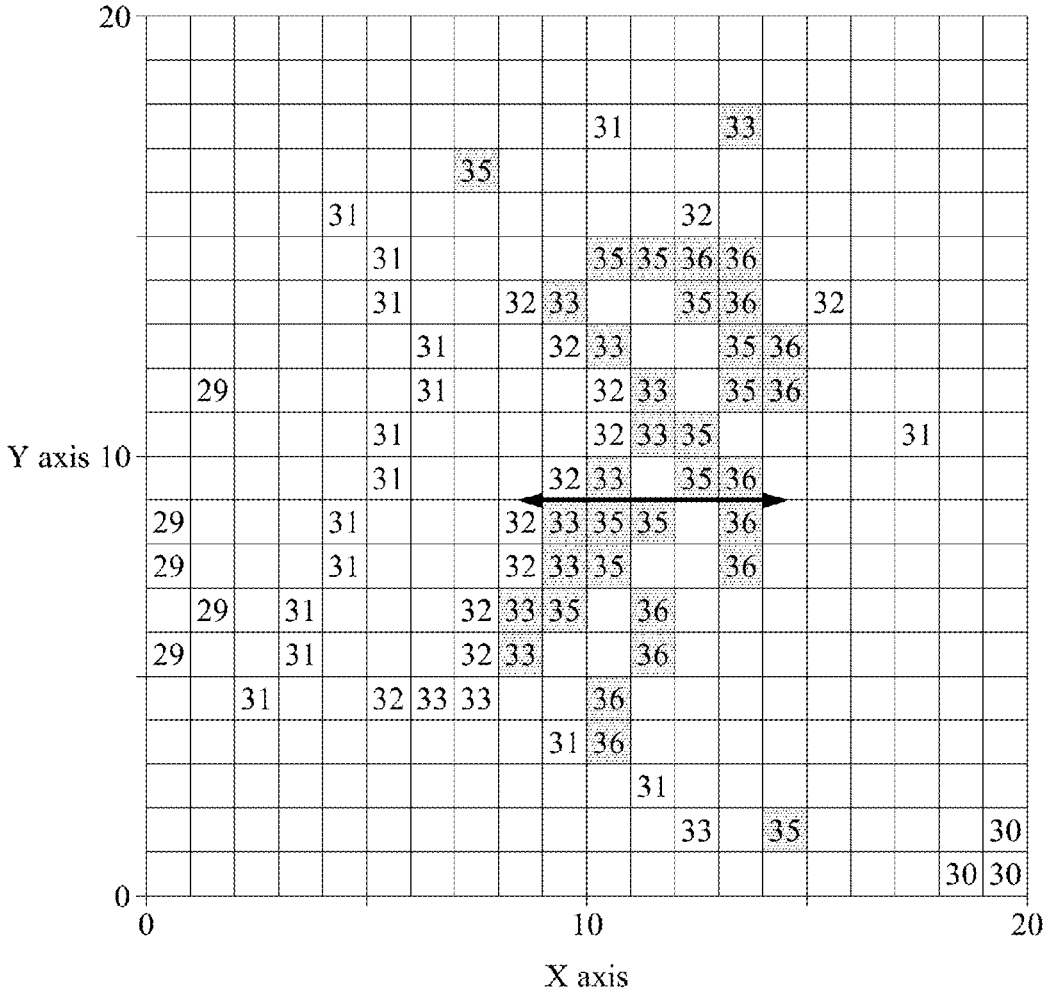
FIGS. 11 and 12 are views illustrating a process of extracting a static pattern based on a thickness of an edge according to an exemplary embodiment.
Figure 12:
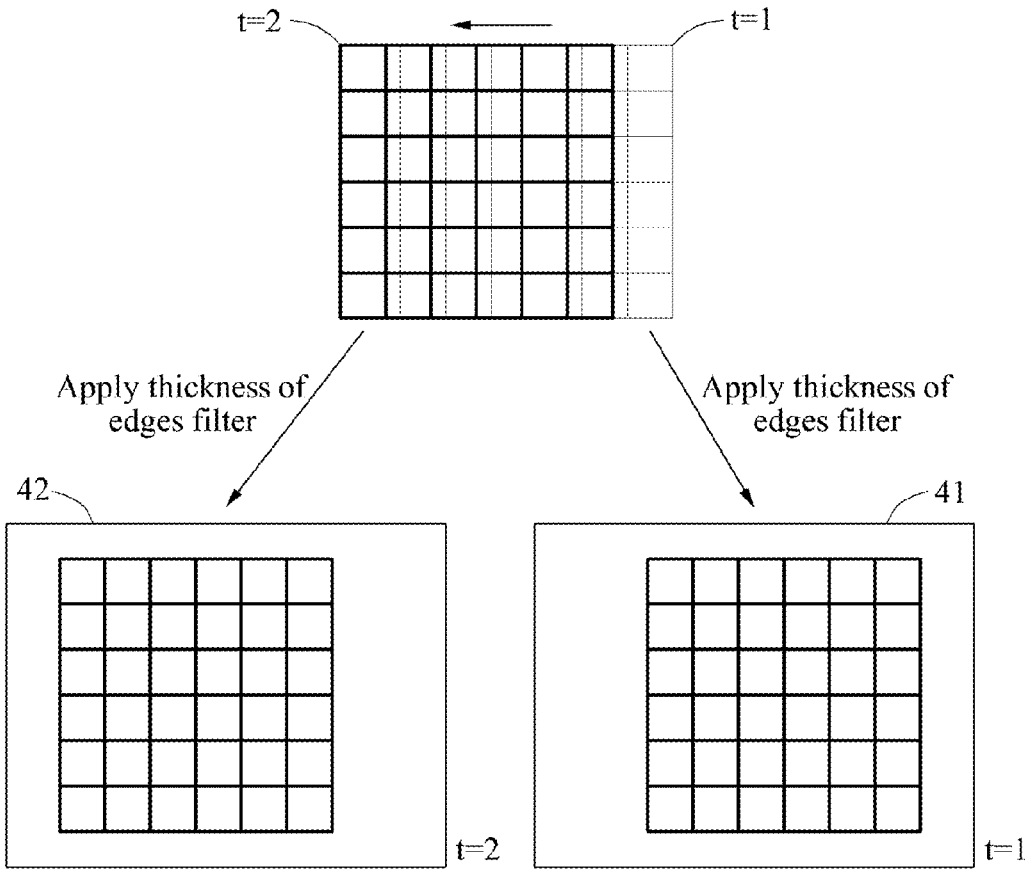

FIGS. 11 and 12 are views illustrating a process of extracting a static pattern based on a thickness of an edge according to an exemplary embodiment. FIG. 11 illustrates a 20×20 timestamp map with timestamps. The timestamp map of FIG. 11 shows that an object moved during a period from a time "29" to a time "36" and that a current time is after the time "36."

The processor 130 may track a ridge so that a thickness of an edge included in the ridge may be equal to or less than a threshold thickness. For example, when the thickness of the edge is determined based on a number of elements in an X-axis direction, and when a threshold thickness is set to "5," elements or pixels corresponding to timestamps, each having a value between "33" and "36," may be determined to form a ridge, as shown in the timestamp map of FIG. 11, according to an exemplary embodiment. The thickness of the edge may be determined by various schemes. The thickness of the edge may be determined, for example, based on a number of elements in an X-axis direction, a number of elements in a Y-axis direction, a width perpendicular to a direction of the ridge, or various combinations thereof. This is provided by way of an example and not by way of a limitation.

Tracking of a ridge may be applicable to an exemplary embodiment in which an object has a pattern. For example, when an object has a pattern, pixels used to reconstruct the pattern as well as pixels used to reconstruct a visible outline may be required. In an exemplary embodiment, a plurality of pixels may be used to represent an appearance of the object, in comparison to when an object does not have a pattern. Also, a static pattern may be properly extracted from a timestamp map through tracking of a ridge based on a thickness of an edge.

Referring to FIG. 12, according to an exemplary embodiment, a moving object may have a pattern, for example, a repetitive pattern. For example, when a number of elements, instead of a thickness of an edge included in a ridge, is used to extract a static pattern, the static pattern may have a low sharpness due to an insufficient number of elements used to extract the pattern together with a visible outline of the object. Conversely, when the thickness of the edge in the ridge is directly used to extract a static pattern, a sharp appearance of an object may be obtained as shown in static patterns 41 and 42 at points in time "1" and "2" based on a proper number of elements used to extract the pattern together with the visible outline of the object.

A threshold thickness may be variously defined. For example, the threshold thickness may be defined as a minimum thickness, an average thickness and a maximum thickness among thicknesses of edges included in a ridge, or various combinations thereof. When the threshold thickness is defined as the average thickness, the processor 130 may track the ridge so that a thickness of each of the edges in the ridge may be equal to or less than the average thickness. The processor 130 may extract a sharp static pattern of an object with a complex pattern by tracking a ridge based on a thickness of an edge in the ridge according to an exemplary embodiment.

A process of extracting a static pattern in an example in which a timestamp map includes a single region has been described above according to an exemplary embodiment. According to yet another exemplary embodiment, the timestamp map may include a plurality of regions. The processor 130 may set a plurality of regions in a timestamp map, and may extract a static pattern from each of the regions. When a plurality of objects exist, the processor 130 may set a plurality of regions corresponding to the plurality of objects in a timestamp map. When a plurality of regions are set in a timestamp map, a static pattern of each of a plurality of objects may be clearly extracted, despite a time difference between movements of the objects. The plurality of regions will be further described with reference to FIGS. 13 and 14, according to an exemplary embodiment.

Figure 13:
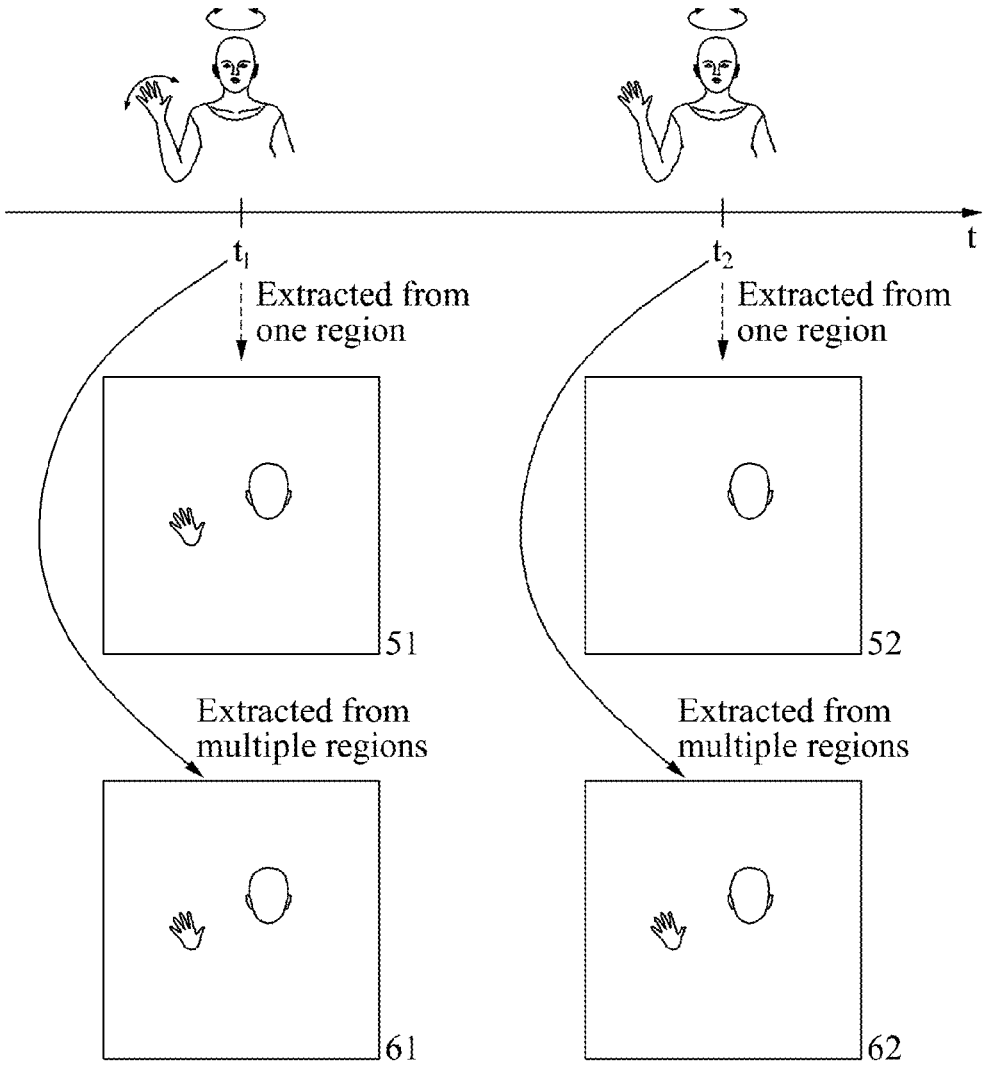
FIGS. 13 and 14 are views illustrating a process of extracting a static pattern based on a plurality of regions set in a timestamp map according to an exemplary embodiment.
Figure 14:
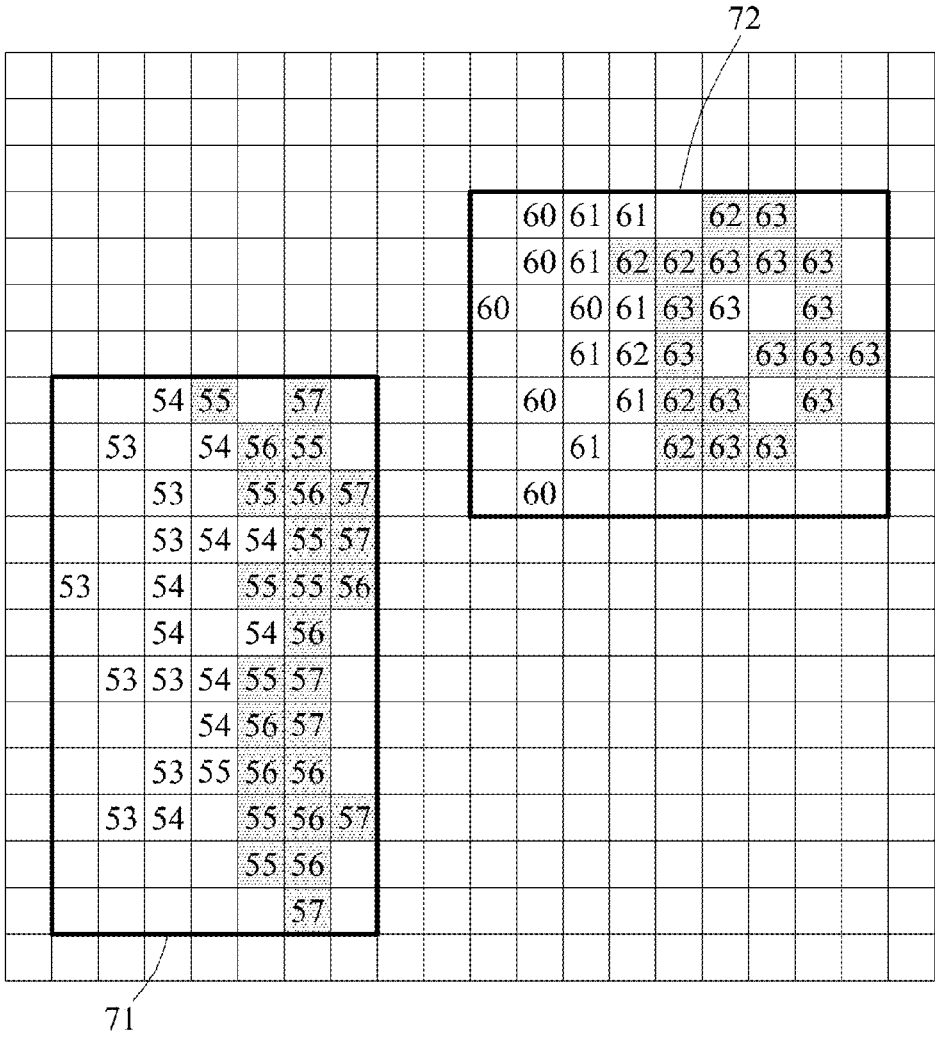

FIGS. 13 and 14 are views illustrating a process of extracting a static pattern based on a plurality of regions set in a timestamp map according to an exemplary embodiment. FIG. 13 illustrates movements of an object during a period from a time $t_1$ to a time $t_2$, first static patterns 51 and 52, and second static patterns 61 and 62. The first static patterns 51 and 52 may be extracted from a single region, and the second static patterns 61 and 62 may be extracted from a plurality of regions. In the following description of an exemplary embodiment, a hand and a head of a user may be referred to as a first object and a second object, respectively. In FIG. 13, the first object and the second object move together at the time $t_1$, and the second object moves at the time $t_2$.

When a single region is set in a timestamp map, a criterion to extract a static pattern may be equally applied to the entire timestamp map. In an exemplary embodiment, when the first object and the second object move in overlapping time intervals in the time $t_1$, both an appearance of the first object and an appearance of the second object may be extracted as shown in the first static pattern 51. In another exemplary embodiment, when the first object does not move and the second object moves in the time $t_2$, a ridge may be formed based on a movement of the second object. In this exemplary embodiment, the appearance of the second object may be extracted, as shown in the second static pattern 52 without the first object.

When a plurality of regions are set in a timestamp map, an appearance of each of the first object and the second object may be properly extracted. When the plurality of regions are set, different criteria to extract a static pattern may be applied for each of the regions in the timestamp map. For example, the processor 130 may set a criterion to extract a static pattern so that a ridge may be formed based on the appearance of the first object in a first region. Also, the processor 130 may set another criterion to extract a static pattern so that a ridge may be formed based on the appearance of the second object in a second region, as shown in element 62 of FIG. 13.

FIG. 14 illustrates a first region 71 and a second region 72 for a plurality of objects in a timestamp map according to an exemplary embodiment. The first region 71 and the second region 72 may correspond to the first object and the second object, respectively. The first region 71 may include elements corresponding to timestamps, each having a value between "53" and "57." The second region 72 may include elements corresponding to timestamps, each having a value between "60" and "63." Accordingly, the first object and the second object may be determined to sequentially move according to an exemplary embodiment. That is, in an exemplary embodiment, regions may be determined based on the timestamps. In other words, each region may correspond to a particular, non-overlapping range of timestamps such as region A, all timestamps having values between 1 and 15, region B, all timestamps having values between 16 and 30. For example, when a hand of a user moves, timestamp values maybe generated. Using these generated timestamp values, regions may be set. The above is provided by way of an example, not by way of a limitation. For example, regions may be determined by a pre-trained classifier.

The processor 130 may set the first region 71 and the second region 72 based on a distribution of the timestamps. For example, the processor 130 may set the first region 71 and the second region 72 based on a part of an object corresponding to a dynamic input. The processor 130 may set individual criteria to extract a pattern for each of the first region 71 and the second region 72. For example, the processor 130 may set individual threshold time intervals for each of the first region 71 and the second region 72. Also, the processor 130 may track a ridge based on a thickness of an edge included in the ridge from each of the first region 71 and the second region 72. The processor 130 may set individual threshold thicknesses for each of the first region 71 and the second region 72. Hereinafter, a representative process of extracting a static pattern based on a threshold time interval is described according to an exemplary embodiment, by way of an example and not by way of a limitation.

The processor 130 may extract a static pattern of the first object from the first region 71 based on a first threshold time interval for the first region 71, and may extract a static pattern of the second object from the second region 72 based on a second threshold time interval for the second region 72. For example, when a current time is set to "65" in the timestamp map of FIG. 14, the first threshold time interval and the second threshold time interval may be set as unit times of "10" and "3," respectively.

The above-described process of extracting a static pattern based on a single region may be applied to a process of extracting a static pattern based on a plurality of regions. For example, the processor 130 may adjust a length of a threshold time interval based on a number of elements included in each of the first region 71 and the second region 72. The processor 130 may adjust the length of the threshold time interval based on a number of valid event signals received based on each of the first region 71 and the second region 72. The valid event signals may refer to event signals processed to be valid. Whether an event signal is valid may be determined based on a time at which the event signal is received. In response to a new event signal being received based on each of the first region 71 and the second region 72, the processor 130 may adjust the length of the threshold time interval. In other words, the processor 130 may adjust the length of the threshold time interval only when a new event signal is received. The above description may be applicable to adjusting of the threshold time interval in the other situations. This is provided by way of an example only and not by way of a limitation.

Figure 15:
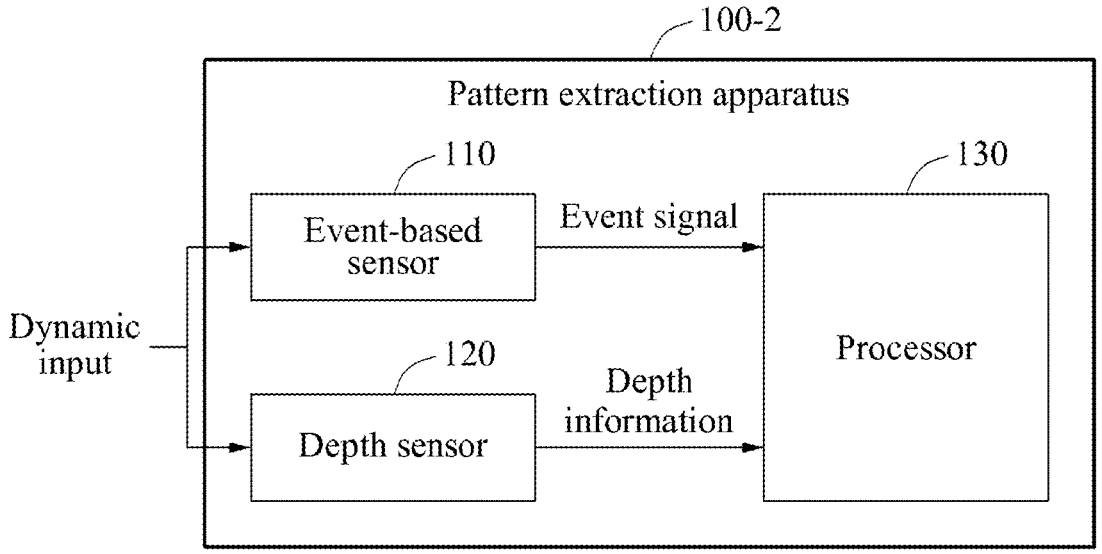
FIG. 15 is a block diagram illustrating another example of a pattern extraction apparatus according to an exemplary embodiment.

FIG. 15 is a block diagram illustrating a pattern extraction apparatus according to yet another exemplary embodiment.

Referring to FIG. 15, a pattern extraction apparatus 100-2 includes an event-based sensor 110, a depth sensor 120, and a processor 130. The pattern extraction apparatus 100-2 may generate a plurality of timestamp maps for each depth, and may extract static patterns from the plurality of timestamp maps for each depth. The pattern extraction apparatus 100-2 may properly reconstruct a static pattern of each of a plurality of objects by managing the plurality of timestamp maps for each depth, despite an occlusion between the objects.

The event-based sensor 110 outputs an event signal in response to a dynamic input. The event signal may include identification information and time information corresponding to the dynamic input. The above description of the event-based sensor 110 and the processor 130 of FIG. 1 may also be applicable, by way of an example, to the event-based sensor 110 and the processor 130 of FIG. 15 and accordingly, further description of the event-based sensor 110 and the processor 130 of FIG. 15 will not be repeated here.

The depth sensor 120 outputs depth information. The depth sensor 120 includes a plurality of sensing pixels. The depth sensor 120 may output depth information sensed by the plurality of sensing pixels. The depth sensor 120 may have the same resolution as that of the event-based sensor 110. In response to a dynamic input, the depth sensor 120 may output depth information corresponding to the dynamic input. Although not shown in FIG. 15, the depth sensor 120 may receive an event signal, and may output depth information sensed by a pixel corresponding to location information of the received event signal.

The processor 130 may generate a plurality of timestamp maps for each of different depths. The processor 130 may update one of the timestamp maps based on the event signal received from the event-based sensor 110 and the depth information received from the depth sensor 120. For example, when first depth information is received in response to a first event signal, the processor 130 may update a timestamp based on the first event signal in a first timestamp map corresponding to a first depth region. An operation of the processor 130 in association with a plurality of timestamp maps will be described with reference to FIGS. 16 and 17, according to an exemplary embodiment.

Figure 16:
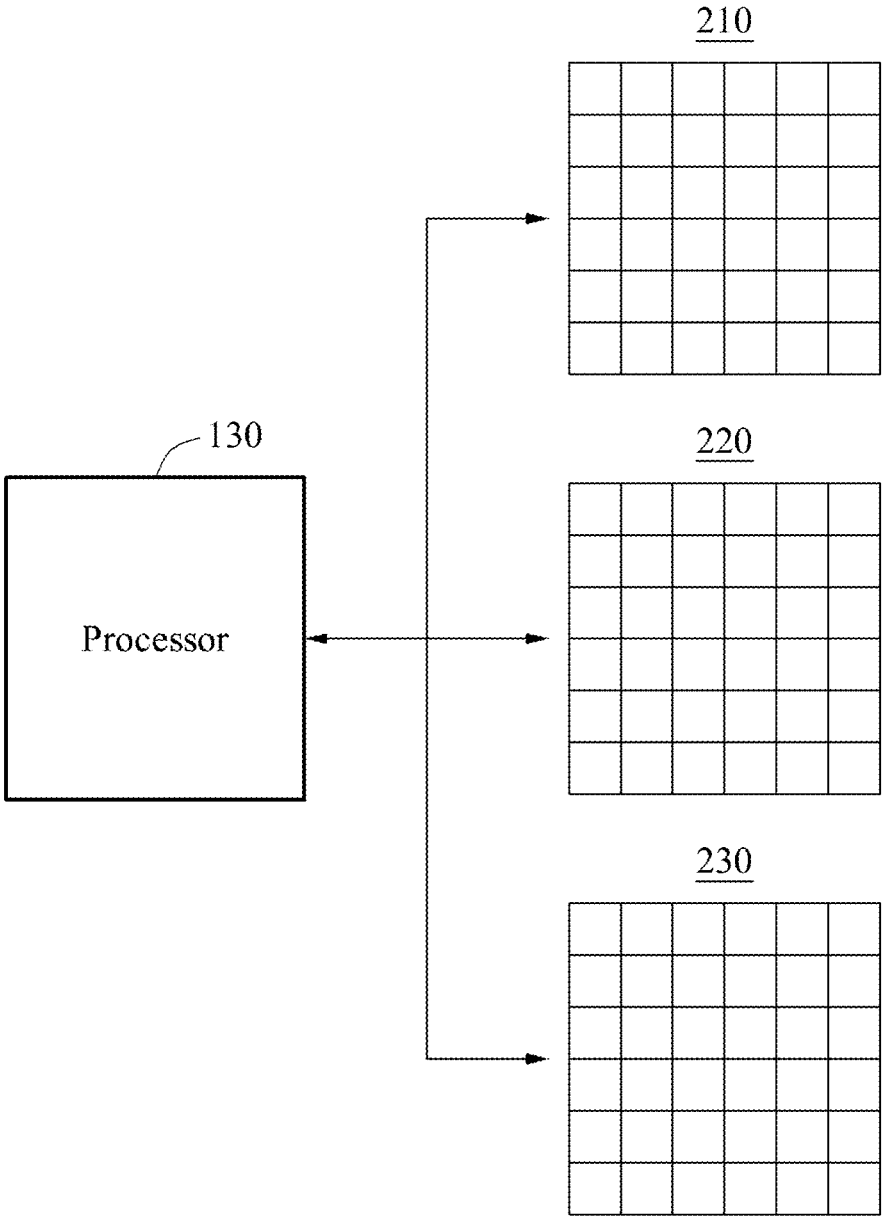
FIG. 16 is a flow diagram illustrating a process of processing a plurality of timestamp maps according to an exemplary embodiment.

FIG. 16 is a flow diagram illustrating a process of processing a plurality of timestamp maps according to an exemplary embodiment. FIG. 16 illustrates the processor 130, a first timestamp map 210, a second timestamp map 220 and a third timestamp map 230. The first timestamp map 210, the second timestamp map 220 and the third timestamp map 230 may correspond to a first depth region, a second depth region and a third depth region, respectively. The first timestamp map 210 through the third timestamp map 230 may be referred to as two-dimensional (2D) timestamp maps.

When an event signal is received, the processor 130 may select a timestamp map corresponding to the event signal from the first timestamp map 210 through the third timestamp map 230 based on depth information. For example, when the depth information corresponds to the first depth region, the processor 130 may select the first timestamp map 210. The processor 130 may update the first timestamp map 210 based on identification information and time information included in the event signal.

The processor 130 may extract a ridge from at least one of the first timestamp map 210 through the third timestamp map 230. An exemplary process of extracting a ridge has been described above and accordingly, further description of the process will not be repeated here. The processor 130 may extract a static pattern based on the extracted ridge. For example, the processor 130 may extract a plurality of static patterns from each of the first timestamp map 210 through the third timestamp map 230. Also, the processor 130 may generate a single composite map based on the first timestamp map 210 through the third timestamp map 230, and may extract a static pattern based on a ridge of the composite map. When timestamps corresponding to the same coordinates in the first timestamp map 210 through the third timestamp map 230 overlap, the processor 130 may generate a single composite map based on a latest timestamp among the overlapping timestamps. For example, a composite map may be generated based on a latest timestamp from all three timestamp maps. In other words, in an exemplary embodiment, from various timestamp maps (one for each depth), the highest value for each pixel is obtained and one composite map is generated.

Exemplary embodiments may be modified to a scheme of generating a three-dimensional (3D) timestamp map, although not shown in the drawings, instead of a plurality of 2D timestamp maps. For example, a 3D timestamp map may store a pair of time information and depth information in an element corresponding to identification information. The processor 130 may store time information and depth information in a storage element corresponding to identification information.

In an exemplary embodiment, the depth information may be quantized to predetermined depth regions. In an exemplary embodiment, the processor 130 may generate a 3D timestamp map including a pair of latest time information and latest depth information for each of the depth regions. In response to a reception of new depth information quantized to the same depth region as depth information of a pair of time information and the depth information that are stored in advance, the processor 130 may overlap a pair of new time information and the new depth information on a corresponding element.

Figure 17:
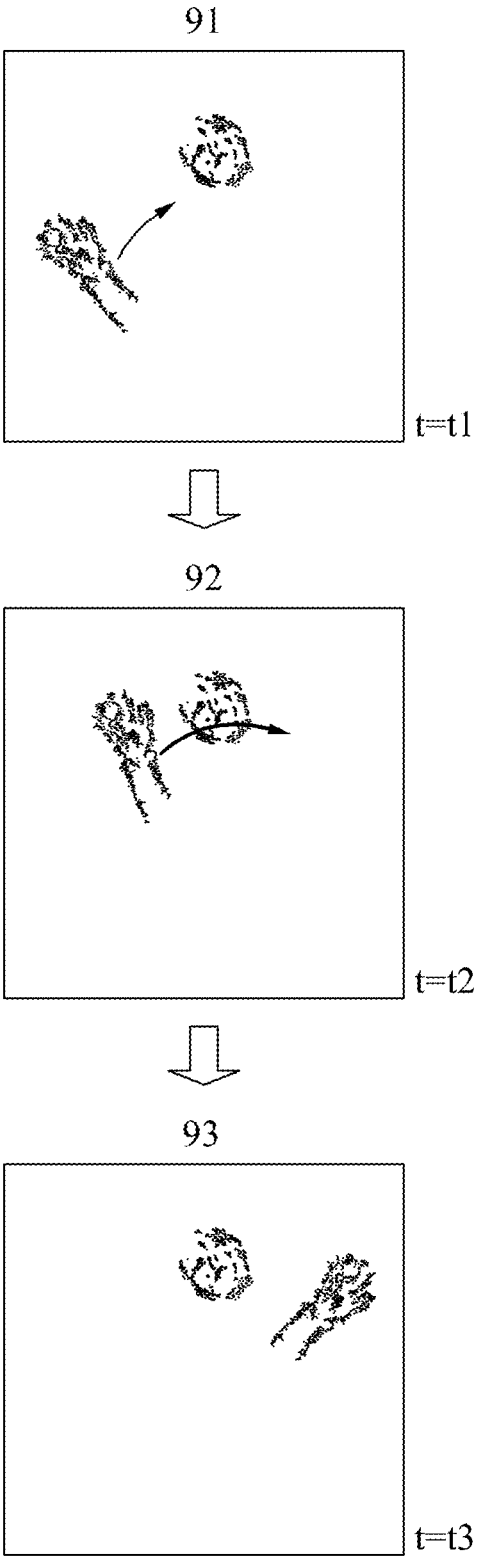
FIG. 17 is a flow diagram illustrating a result obtained by processing a plurality of timestamp maps according to an exemplary embodiment.

FIG. 17 is a flow diagram illustrating a result obtained by processing a plurality of timestamp maps according to an exemplary embodiment. FIG. 17 illustrates static patterns 91, 92 and 93 extracted from a plurality of timestamp maps. Each of the static patterns 91, 92 and 93 includes a first object corresponding to a user's hand and a second object corresponding to a user's face. In FIG. 17, the first object and the second object are assumed to have different depths, and an arrow in each of the static patterns 91 and 92 indicate a movement direction of the first object.

The processor 130 may update an event signal corresponding to the first object in a first timestamp map, and may update an event signal corresponding to the second object in a second timestamp map. Accordingly, when an occlusion between the first object and the second object occurs, a static pattern of the first object and a static pattern of the second object may be independently reconstructed. For example, referring to FIG. 17, an occlusion between the first object and the second object may occur between times t2 and t3. In this example, both the first object and the second object may be independently reconstructed based on the plurality of timestamp maps as shown in the static pattern 93.

The processor 130 may set a plurality of regions in at least one of the plurality of timestamp maps. The processor 130 may set the plurality of regions based on a distribution of timestamps. The processor 130 may set individual criteria to extract a pattern for each of the regions. For example, the processor 130 may set individual threshold time intervals for each of the regions, and may adjust a length of each of the threshold time intervals based on a number of elements included in each of the regions. The above description may be applicable to a pattern extraction process for the plurality of regions, according to an exemplary embodiment.

Figure 18:
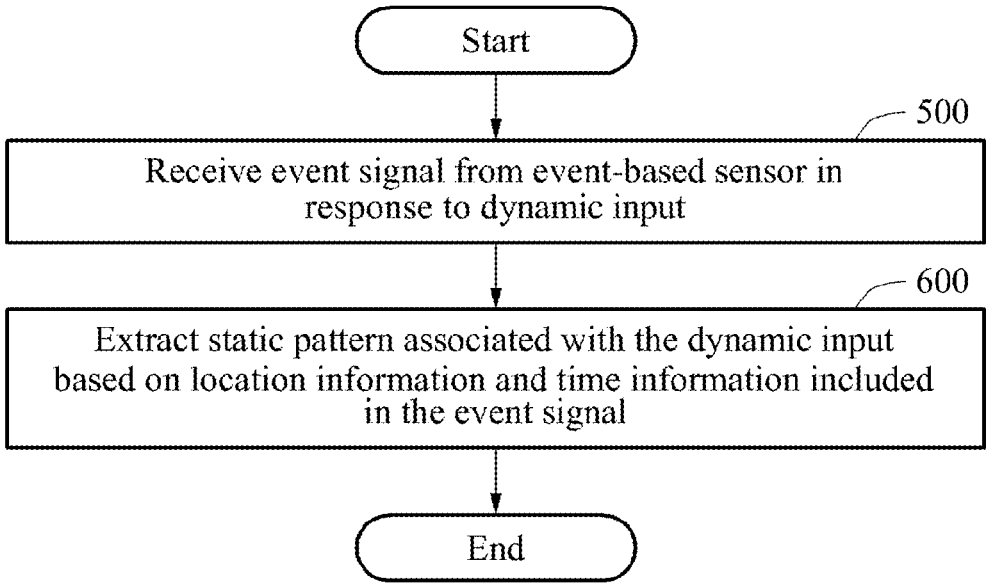
FIG. 18 is a flowchart illustrating a pattern extraction method according to an exemplary embodiment.

FIG. 18 is a flowchart illustrating a pattern extraction method according to an exemplary embodiment.

Referring to FIG. 18, in operation 500, a pattern extraction apparatus receives an event signal in response to a dynamic input. The event signal may be output by an event-based sensor. In operation 600, the pattern extraction apparatus extracts a static pattern associated with the dynamic input based on identification information and time information included in the event signal. The above-description of FIGS. 1 through 17 is also applicable to the pattern extraction method of FIG. 18, by way of an example, and accordingly, further description thereof will not be repeated here.

In yet another exemplary embodiment, both the thickness of the edges and the number of elements may be used to determine a static pattern associated with the event signal. In an exemplary embodiment, the number of elements may be adjusted so that an edge may have a preset thickness. For example, when an object is moving, an event signal may be generated in an edge of the object, and the number of elements may be adjusted so that edges corresponding to the event signal may continue to have a thickness of average about 2 pixels. This is provided by way of an example and not by way of a limitation. In an exemplary embodiment, a combination of the thickness of the edges and the number of elements may be used to generate the pattern.

The elements or components described herein may be implemented using hardware components, software components, or a combination thereof. For example, the hardware components may include microphones, amplifiers, bandpass filters, audio to digital convertors, and processing devices. A processing device may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes, modifications, and variations may be made to these exemplary embodiments without departing from the principles and spirit of the disclosure, the scope of which is defined by the claims and their equivalents.

What is claimed is:

1. A pattern extraction method comprising:

receiving an event signal indicating an event from an event-based sensor;

extracting a static pattern, which represents an object, based on an identification and time included in the event signal; and outputting the extracted static pattern, wherein the identification comprises location information of each of a plurality of pixels of the event-based sensor that sensed the event and the time comprises a time point in which the event is detected by a respective pixel from among said each pixel, and wherein the extracting comprises generating a map comprising a plurality of elements corresponding to the location information of the plurality of pixels of the event-based sensor in which the time point is a value of a respective element from among the plurality of elements,

*wherein the map is a three dimensional (3D) map and the extracting comprises extracting a ridge from the 3D map generated based on the identification and the time.*

2. The pattern extraction method of claim 1, further comprising:

detecting the event, which is a motion event, by the event-based sensor, which is a motion sensor, based on dynamic input, wherein the dynamic input comprises an event to change at least one of color and intensity of light incident on at least one pixel from among the plurality of pixels in the event-based sensor.

3. The pattern extraction method of claim 2, wherein the static pattern is an appearance of the object in a motionless state associated with the dynamic input.

4. The pattern extraction method of claim 1, wherein the event indicates a motion of the object, and wherein the static pattern corresponds to an appearance of the object in a state in which the motion stops.

5. The pattern extraction method of claim 1, wherein the location information indicates the each pixel that senses a motion of the object among the plurality of pixels of the event-based sensor.

6. The pattern extraction method of claim 1, wherein the time point is a timestamp in which the event is detected based on sensing dynamic input by the each pixel.

7. The pattern extraction method of claim 1, wherein the extracting comprises:

storing the identification and the time for each of a plurality of received events; and extracting the static pattern based on the identification and the time.

8. The pattern extraction method of claim 7, wherein the storing comprises:

storing, for each element of the event-based sensor, the identification comprising address of the element and the time indicating last change of the respective element; and in response to an event changing a state of the respective element, overwriting the time for the respective element in the address for the respective element.

[9. The pattern extraction method of claim 1, wherein the map is a three dimensional (3D) map and the extracting comprises extracting a ridge from the 3D map generated based on the identification and the time.]

10. The pattern extraction method of claim [9] *1*, wherein the identification corresponds to coordinate values on the 3D map, and the time corresponds to an altitude on the 3D map.

11. The pattern extraction method of claim [9] *1*, wherein the extracting of the ridge comprises extracting at least two elements of the plurality of elements which store the time within a threshold time interval among the plurality of elements included in the 3D map.

12. The pattern extraction method of claim 11, wherein the extracting of the ridge further comprises:

generating a new threshold time interval by adjusting a length of the threshold time interval based on a number of the elements that are extracted; and extracting the at least two elements within the new threshold time interval.

13. The pattern extraction method of claim [9] *1*, wherein the extracting of the ridge comprises tracking the ridge so that a thickness of an edge in the ridge is equal to or less than a threshold thickness.

14. The pattern extraction method of claim 1, wherein the extracting comprises:

setting a region of the map from which the static pattern is to be extracted; and extracting [a] *the* ridge from the region based on a threshold time interval.

15. The pattern extraction method of claim 14, wherein the setting comprises setting the region based on a part of the object corresponding to dynamic input which generates the event of the event-based sensor.

16. The pattern extraction method of claim 14, wherein the extracting *the ridge* further comprises at least one of:

adjusting a length of the threshold time interval based on a number of valid event signals received in the region; and adjusting the length of the threshold time interval in response to a new event signal being received in the set region.

17. The pattern extraction method of claim 1, wherein the extracting further comprises:

receiving depth *information* corresponding to dynamic input sensed by the event-based sensor;

storing the depth *information* in a corresponding element from among the plurality of elements; and extracting the static pattern based on the location, the time point, and the depth *information*.

18. A computer program stored in a non-transitory computer-readable recording medium to implement the method of claim 1 through a combination with hardware.

19. The pattern extraction method of claim 1, further comprising:

receiving at least one additional signal indicating at least one additional [even] *event* from the event-based sensor; and updating at least one point in the map based on the identification and the time, wherein the extracting of the static pattern is asynchronous from the generating and the updating of the map, and

[whereing] *wherein* the location is an (x, y) location for each sensing element of the event-based sensor and the time point is the value for each of the (x, y) location.

20. The pattern extraction method of claim 1, wherein the event-based sensor outputs the information and the time only for sensing elements of the sensor that changed value from off to on or vice versa forming the event.

21. A pattern extraction method comprising:

receiving an event signal indicating an event from an event-based sensor;

extracting a pattern, which represents a motionless object, based on an identification and time included in the event signal; and outputting the pattern, wherein the extracting comprises:

generating a plurality of maps corresponding to a plurality of depth regions based on the identification and the time; and extracting a ridge from at least one of the plurality of maps.

22. The pattern extraction method of claim 21, wherein the generating comprises:

receiving depth *information* corresponding to dynamic input sensed by the event-based sensor;

selecting a map from the plurality of maps based on the depth *information*; and updating the map based on the identification and the time.

23. A pattern extraction apparatus comprising:

an event-based sensor configured to output an event signal indicating an event, the event signal comprising time and an identification of the event; and a processor configured to extract a static pattern, which represents an object, based on the event signal and to output the extracted static pattern outside the pattern extraction apparatus, wherein the identification comprises location information of each of a plurality of pixels of the event-based sensor that sensed the event and the time comprises a time point in which the event is detected by a respective pixel from among said each pixel, [and]

wherein the processor is configured to extract the static pattern by generating a map comprising a plurality of elements corresponding to the location information of the plurality of pixels of the event-based sensor in which the time point is a value of a respective element from among the plurality of elements, *and*

*wherein the processor is configured to extract a ridge from the map, which is a 3D map.*

24. The pattern extraction apparatus of claim 23, wherein the event-based sensor outputs the event signal, which is a motion event, in response to sensing dynamic input, which comprises a change of light incident on at least one pixel from among the plurality of pixels in the event-based sensor.

25. The pattern extraction apparatus of claim 24, wherein the event-based sensor outputs the event signal in response to sensing the dynamic input, which comprises a motion of the object, and wherein the static pattern is an appearance of the object in a state in which the motion stops.

26. The pattern extraction apparatus of claim 23, wherein the location indicates each pixel of the event-based sensor that senses dynamic input among the plurality of pixels of the event-based sensor, and wherein the time point is a timestamp in which the event is detected based on sensing dynamic input by the each pixel.

27. The pattern extraction apparatus of claim 23, wherein the processor is configured to store the identification and the time in a memory, and to extract the static pattern based on the identification and the time.

28. The pattern extraction apparatus of claim 27, wherein the processor is configured to overwrite the time in an element from among the plurality of elements corresponding to the identification based on the event detected by the event-based sensor.

29. The pattern extraction apparatus of claim 23, [wherein the processor is configured to extract a ridge from the map, which is a 3D map, and]

wherein the location is coordinate values on the map, and the time is an altitude on the map.

30. The pattern extraction apparatus of claim 29, wherein the processor is configured to extract at least two elements from among the plurality of elements storing time within a threshold time interval among the plurality of elements included in the map.

31. The pattern extraction apparatus of claim 30, wherein the processor is configured to generate a new threshold time interval by adjusting a length of the threshold time interval based on a number of the at least two elements, and to extract the at least two elements storing time within the new threshold time interval.

32. The pattern extraction apparatus of claim 29, wherein the processor is configured to track the ridge so that a thickness of an edge in the ridge is equal to or less than a threshold thickness.

33. The pattern extraction apparatus of claim 23, wherein the processor is configured to set a region on the map from which the static pattern is to be extracted, and to extract [a] *the* ridge from the region based on a threshold time interval.

34. The pattern extraction apparatus of claim 33, wherein the processor is configured to set the region based on a part of the object corresponding to the event.

35. The pattern extraction apparatus of claim 33, wherein the processor is configured to adjust a length of the threshold time interval based on a number of valid event signals received in the region.

36. The pattern extraction apparatus of claim 33, wherein the processor is configured to adjust a length of the threshold time interval in response to a new event signal being received in the region.

37. The pattern extraction apparatus of claim 23, wherein the processor is configured to generate a plurality of maps corresponding to a plurality of depth regions based on the identification and the time, and to extract [a] *the* ridge from at least one of the plurality of maps.

38. The pattern extraction apparatus of claim 37, further comprising a depth sensor configured to output [a] depth *information* corresponding to the event sensed by the event-based sensor, wherein the processor is configured to select a map from the plurality of maps based on the depth *information*, and to update the map based on the identification and the time.

39. The pattern extraction apparatus of claim 37, further comprising a depth sensor configured to output [a] depth *information* corresponding to the event sensed by the event-based sensor, wherein the processor is configured to store the time and the depth *information* in an element identified by the identification from among the plurality of elements, and to extract the static pattern based on the identification, the time, and the depth *information*.

40. The pattern extraction apparatus of claim 37, wherein the processor is configured to generate a composite map based on the plurality of maps and extract the static pattern based on the composite map.

41. A display apparatus comprising a motion sensor comprising a plurality of sensing pixels and configured to output a signal representing a motion of an object, wherein the motion of the object is represented by time and corresponding location information indicating at least one pixel sensing the motion of the object among the plurality of sensing pixels;

a processor configured to generate at least one map based on the location information and the time, extract elements storing time within a threshold time interval among a plurality of elements included in the map, generate a new threshold time interval by adjusting a length of the threshold time interval based on a number of the extracted elements, and extracting new elements within the new threshold time interval, and detect the object based on the elements and the new elements, extracted by the processor,

*wherein the processor is configured to extract a ridge from the map, which is a 3D map.*

42. The display apparatus of claim 41, further comprising a display which displays the object.

43. The display apparatus of claim 41, wherein the processor controls the display apparatus based on the object.

44. The display apparatus of claim 41, wherein the motion of the object is a non-contact gesture of a user.

*45. A pattern extraction apparatus comprising:*

*an event-based sensor configured to generate time information and identification information in response to an event, and output an event signal including the time information and the identification information; and*

*a memory configured to store the time information and the identification information,*

*wherein the event-based sensor is configured to determine whether a change in a log intensity of light detected by at least one pixel among a plurality of pixels of the event-based sensor, after the event, exceeds a threshold, and to generate an ON event signal or an OFF event signal based on whether the change in the log intensity, after the event, exceeds the threshold,*

*wherein the identification information comprises location information of each of the plurality of pixels of the event-based sensor that sensed the event and the time*

*information comprises a time point in which the event is detected by a respective pixel from among said each pixel, and*

*wherein, based on the event signal, a pattern, representing an object, is extracted, by generating a 3D map comprising a plurality of elements corresponding to the location information of the plurality of pixels of the event-based sensor in which the time point is a value of a respective element from among the plurality of elements, and extracting a ridge from the 3D map.*

*46. The pattern extracting apparatus of claim 45, wherein, the event-based sensor is further configured to:*

*generate the ON event signal based on the change in the log intensity after the event exceeds a first threshold, and*

*generate the OFF event signal based on the change in the log intensity after the event exceeds a second threshold that is lower than the first threshold.*

*47. The pattern extracting apparatus of claim 45, wherein the identification information further comprises an address of the plurality of pixels included in the event-based sensor.*

*48. The pattern extracting apparatus of claim 45, wherein the map is a timestamp map that stores a latest time at which the time information corresponding to each of the plurality of elements is received, as a timestamp.*

*49. The pattern extracting apparatus of claim 45, wherein at least one pixel, sensing the event, among the plurality of pixels of the event-based sensor is an active pixel.*

*50. The pattern extracting apparatus of claim 49, wherein the active pixel is configured to generate an activation signal in response to the event, and*

*wherein the event-based sensor is further configured to generate an event signal comprising the time information and the identification information of the active pixel, based on the activation signal.*

*51. The pattern extracting apparatus of claim 50, wherein the event-based sensor is further configured to generate the event signal asynchronously.*

*52. The pattern extracting apparatus of claim 50, wherein the event-based sensor is further configured to generate a pass flag to identify a plurality of event signals being spatiotemporally associated with each other, and to filter one of the plurality of event signals corresponding to background noise activity.*

*53. A pattern extracting apparatus comprising:*

*an event-based sensor configured to generate time information and identification information based on a movement of an object; and*

*a processor configured to extract a static pattern corresponding to an appearance of the object in a state in which the object stops based on the time information and the identification information,*

*wherein the identification information comprises location information of each of a plurality of pixels of the event-based sensor that sensed the movement of the object and the time comprises a time point in which the movement of the object is detected by a respective pixel from among said each pixel,*

*wherein the processor is configured to extract the static pattern by generating a map comprising a plurality of elements corresponding to the location information of the plurality of pixels of the event-based sensor in which the time point is a value of a respective element from among the plurality of elements, and*

*wherein the processer is further configured to track the static pattern to adjust a thickness of an edge of the static pattern to be equal or less than a threshold thickness.*

*54. The pattern extracting apparatus of claim 53, wherein the identification information further comprises an address indicating at least one pixel, from among the plurality of pixels, sensing the movement of the object.*

*55. The pattern extracting apparatus of claim 54, wherein the map is a timestamp map storing a timestamp corresponding to each of the plurality of elements.*

*56. The pattern extracting apparatus of claim 55, wherein the processor is further configured to update the timestamp map by overwriting the timestamp corresponding to at least one of the plurality of elements with a new timestamp received from the event-based sensor.*

*57. The pattern extracting apparatus of claim 54, wherein the processor is further configured to extract the static pattern based on the timestamp last stored in each of the plurality of elements.*

*58. The pattern extracting apparatus of claim 55, wherein the processor is further configured to extract the static pattern based on the timestamp within a threshold time interval.*

*59. The pattern extracting apparatus of claim 58, wherein the processor is further configured to adjust a length of the threshold time interval to set a number of the plurality of elements storing the timestamp within the threshold time interval being greater than a predetermined minimum number and lesser than a predetermined maximum number.*

*60. The pattern extracting apparatus of claim 58, wherein the processor is further configured to, based on the timestamp map comprising a first region corresponding to a first object and a second region corresponding to a second object different from the first object, apply a first threshold time interval to the first region and a second threshold time interval to the second region, the second threshold different being from the first threshold time interval.*

* * * * *